United States Patent
Arimura

(10) Patent No.: US 8,599,102 B2
(45) Date of Patent: Dec. 3, 2013

(54) WIRELESS COMMUNICATION MODULE

(75) Inventor: Shogo Arimura, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 348 days.

(21) Appl. No.: 12/956,217

(22) Filed: Nov. 30, 2010

(65) Prior Publication Data

US 2011/0128207 A1 Jun. 2, 2011

(30) Foreign Application Priority Data

Dec. 2, 2009 (JP) ................................. 2009-274982

(51) Int. Cl.
*H01Q 1/50* (2006.01)

(52) U.S. Cl.
USPC ........................................................ 343/906

(58) Field of Classification Search
USPC .................. 343/906, 829, 700 MS, 767, 770; 455/557–558
See application file for complete search history.

(56) References Cited

U.S. PATENT DOCUMENTS

| 5,812,094 A * | 9/1998 | Maldonado .................... 343/702 |
| 7,876,270 B2 * | 1/2011 | Fabrega-Sanchez et al. . 343/702 |
| 7,979,089 B2 * | 7/2011 | Nghiem et al. ................ 455/558 |
| 2006/0202312 A1 * | 9/2006 | Iijima et al. .................... 257/664 |

FOREIGN PATENT DOCUMENTS

| JP | 2006-340153 | 12/2006 |
| JP | 2008-192993 | 8/2008 |
| JP | 2008-227376 | 9/2008 |
| JP | 2009-060160 | 3/2009 |
| JP | 2009-123958 | 6/2009 |

OTHER PUBLICATIONS

Japanese Office Action dated Sep. 3, 2013.

* cited by examiner

*Primary Examiner* — Huedung Mancuso
(74) *Attorney, Agent, or Firm* — IPUSA, PLLC

(57) ABSTRACT

A card type wireless communication module, includes a board; a plurality of terminals formed on the board, the terminals including an external antenna terminal, the terminals having a plating process applied thereto; and a ground pattern formed on the board; wherein a feeding wiring pattern arrangement area is formed between forming positions of the terminals on the board and a forming position of the ground pattern, the feeding wiring pattern arrangement area has a feeding wiring pattern formed thereon, the feeding wiring pattern feeds power to the terminals at the time of an electrolytic plating process, and the feeding wiring pattern is removed after the electrolytic plating process is completed.

6 Claims, 11 Drawing Sheets

WIRELESS COMMUNICATION MODULE

CROSS-REFERENCE TO RELATED APPLICATIONS

This patent application is based upon and claims the benefit of priority of Japanese Patent Application No. 2009-274982 filed on Dec. 2, 2009, the entire contents of which are incorporated herein by reference.

BACKGROUND OF THE INVENTION

1. Field of the Invention

The present invention generally relates to card type wireless communication modules. More specifically, the present invention relates to a card type wireless communication module including a high frequency terminal where a plating process is applied.

2. Description of the Related Art

In a mobile communication terminal such as a portable phone, it is generalized that the terminal has a wireless function such as infrared or Bluetooth (registered trademark) transmitting and receiving for transferring data a short distance. In addition, it has been demanded that a function of a wireless LAN for transferring data an intermediate distance be additionally provided in the mobile communication terminal.

The wireless LAN is additionally provided, for example, in the following way. That is, a circuit block of the wireless LAN including an antenna is provided at a card device such as a micro SD card so that a card type wireless communication module is formed. This card type wireless communication module is provided at a mobile communication terminal. In addition, the following technique is known (see, for example, Japanese Laid-Open Patent Application Publication No. 2009-60160). That is, a card device antenna is provided at the mobile communication terminal. When the card type wireless module is provided at the mobile communication terminal, the card device antenna is connected to the card device.

Since this kind of card type wireless communication module is a card, an inserting and pulling out process is performed with a corresponding connector many times. Because of this, it is required that an electric resistance of a terminal provided at the card type wireless communication module be low. In addition, in a case where an oxide film is formed on a surface of the terminal, since the oxide film normally has insulating properties, the electric resistance is increased. Accordingly, it is desirable that the terminal provided at the card type communication module be made of a non-oxidizing material. Therefore, it is normal practice that an electrolytic plating process is applied to the terminal provided at the card type communication module.

In order to apply gold plating to the terminal of the card type communication module, it is necessary to apply a voltage to each of the terminals. Therefore, it is necessary to provide a copper foil pattern (feeding wiring pattern) for electrolytic plating at each of the terminals separated from a signal line or an electric power line of the terminal.

FIG. 1 is a schematic view showing an internal structure of a related art card type wireless communication module. More specifically, FIG. 1 shows a board 300 of a related art card type wireless communication module 200 where feeding wiring patterns 290 are provided. As illustrated in FIG. 1, plural feeding wiring patterns 290 connected to corresponding terminals 210, 260, and 270 one by one are formed in a feeding wiring pattern arrangement area 330 on the board 300. An antenna 230 is provided in a position lower than the feeding wiring pattern arrangement area 330 of the board 300.

The feeding wiring pattern 290 is not necessary after a plating process performed on the terminals 210, 260 and 270 is completed. If the feeding wiring pattern 290 still remains, the terminals 210, 260 and 270 may be shorted. Because of this, in the related art, after the plating process is completed, a process for cutting each of the feeding wiring patterns 290 is performed (see, for example, Japanese Laid-Open Patent Application Publication No. 2009-123958 and Japanese Laid-Open Patent Application Publication No. 2008-192993).

FIG. 2 is a schematic view of the related art card type wireless communication module 200 illustrated in FIG. 1 where the feeding wiring patterns 290 are cut. Positions indicated by arrows X in FIG. 2 are cutting positions of the feeding wiring patterns 290.

However, in the related art, parts of the feeding wiring patterns 290 are cut so that connections between the feeding wiring patterns 290 and the corresponding terminals 210, 260 and 260 are cut. Therefore, the parts of the feeding wiring patterns 290 remain on the board 300 after the cutting process is completed. The remaining feeding wiring patterns 290 are called a remaining wiring pattern 290a.

In the meantime, if a conductive line is provided in parallel with a high frequency transmission line, an open stub is created so that impedance of the transmission line may be influenced. Therefore, if the remaining wiring pattern 290a is provided in parallel with the high frequency transmission line, mismatch of impedance may be generated on the transmission line. Because of this, elements reacting at a high frequency may be increased so that transmission loss may be generated.

Furthermore, in a case where the remaining wiring pattern 290a has a length (for example, ½ wavelength or ¼ wavelength) whereby there is resonance relative to a high frequency signal to be transmitted, the remaining wiring pattern 290a may operate as an antenna and thereby high frequency electric energy may be unintentionally radiated.

In addition, in the related art, a single feeding wiring pattern 290 is provided to a single terminal 210. Accordingly, it may be necessary to provide a large number of feeding wiring patterns 290. Therefore, the feeding wiring pattern arrangement area 330 on the board 300 may be wide.

Since the communication module 200 is a thin card type module, the mechanical strength of the communication module 200 may be low. Accordingly, it may be preferable to form a reinforcing pattern at the board 300. However, if an area of the feeding wiring pattern arrangement area 330 is wide, there is no freedom degree of design for the board 300 and therefore it may not be possible to form the reinforcing pattern.

SUMMARY OF THE INVENTION

Accordingly, embodiments of the present invention may provide a novel and useful card type wireless communication module solving one or more of the problems discussed above.

More specifically, the embodiments of the present invention may provide a card type wireless communication module whereby degradation of transmission efficiency of a high frequency characteristic can be prevented and strength of the module can be improved.

Another aspect of the embodiments of the present invention may be to provide a card type wireless communication module, including a board; a plurality of terminals formed on the board, the terminals including an external antenna terminal, the terminals having a plating process applied thereto;

and a ground pattern formed on the board; wherein a feeding wiring pattern arrangement area is formed between forming positions of the terminals on the board and a forming position of the ground pattern, the feeding wiring pattern arrangement area has a feeding wiring pattern formed thereon, the feeding wiring pattern feeds power to the terminals at the time of an electrolytic plating process, and the feeding wiring pattern is removed after the electrolytic plating process is completed.

Additional objects and advantages of the embodiments are set forth in part in the description which follows, and in part will become obvious from the description, or may be learned by practice of the invention. The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

A description is given below, with reference to the FIG. 3A through FIG. 11 of embodiments of the present invention.

Figure 3A:
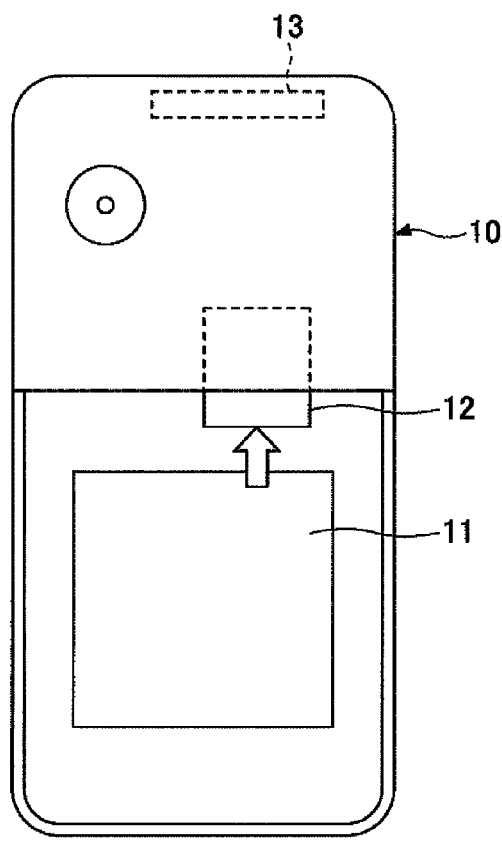
FIG. 3A is a plan view showing a mobile communication terminal where a card type wireless communication module of an embodiment of the present invention is provided.

FIG. 3A is a plan view showing a mobile communication terminal 10 where a card type wireless communication module 20 of an embodiment of the present invention is provided.

Figure 3B:
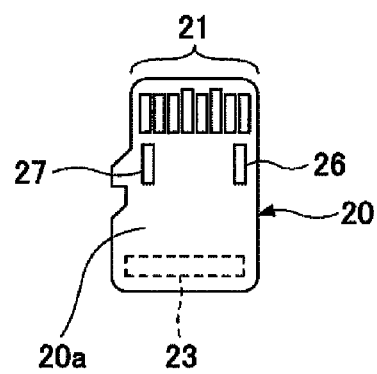
FIG. 3B is a plan view of the card type wireless communication module of the embodiment of the present invention.

FIG. 3B is a plan view of the card type wireless communication module 20 of the embodiment of the present invention. A state where a rear surface cover of the mobile communication terminal 10 is taken off is illustrated in FIG. 3A.

In the mobile communication terminal 10, a card device connector 12 is provided in the vicinity of a battery receiving position where a battery pack 11 is received. The card type wireless communication module 20 is inserted in a direction indicated by an arrow in the card device connector 12. The card type wireless communication module 20 has a structure whereby the card type wireless communication module 20 can be attached to or detached from the mobile communication terminal 10.

An antenna 13 of a 2.4 GHz frequency band for Bluetooth (registered trademark) is provided in the mobile communication terminal 10. In addition to the antenna 13, an antenna for mobile communication, an antenna for one segment of digital terrestrial broadcasting, or the like is provided in the mobile communication terminal 10.

Figure 5:
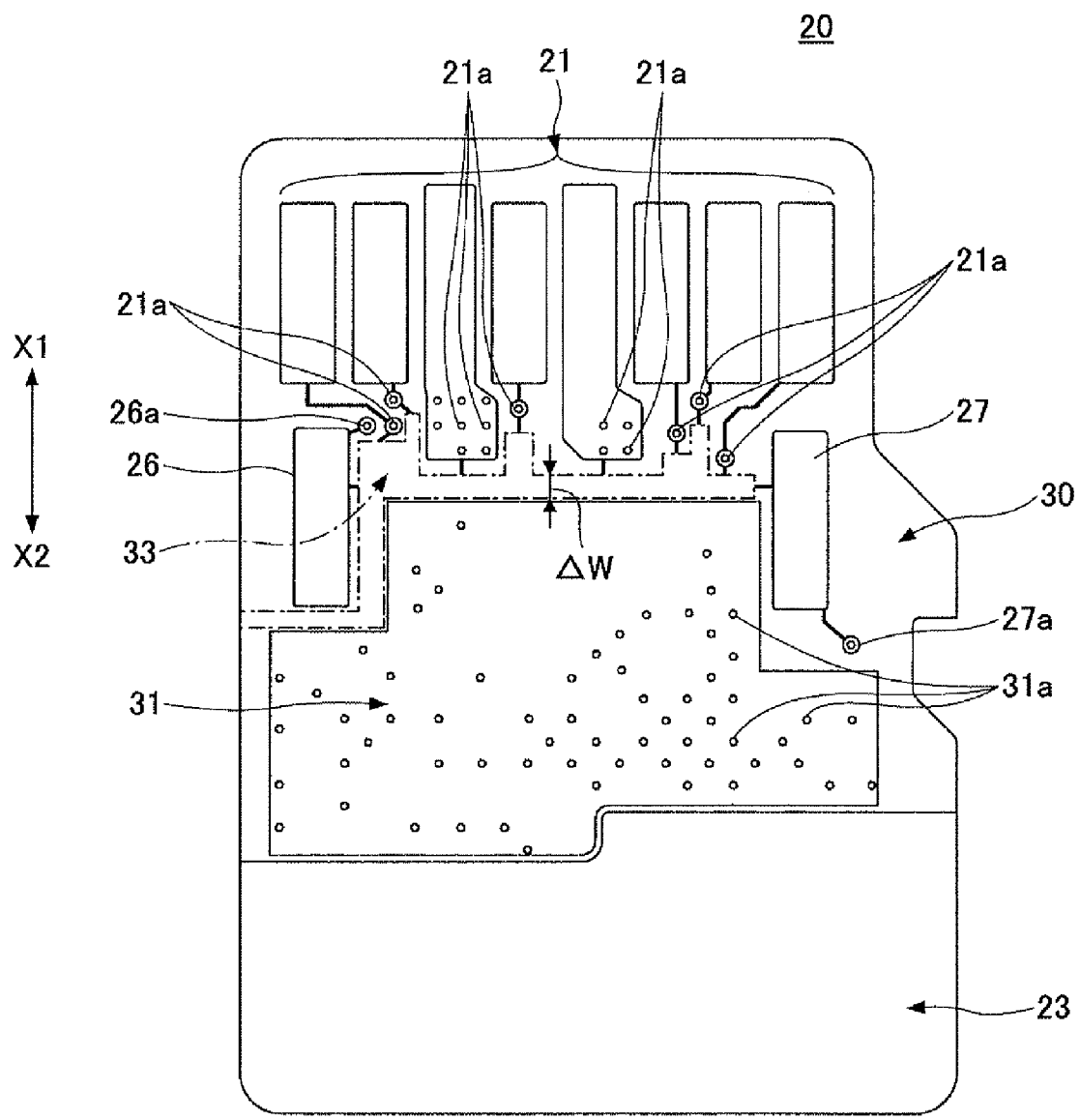
FIG. 5 is a schematic view showing an internal structure of the card type wireless communication module of the embodiment of the present invention.

The card type wireless communication module 20 has an external configuration substantially same as that of a micro SD card. In addition to eight terminals 21 for the micro SD card standard, two terminals 26 and 27 are provided at the card type wireless communication module 20. The eight terminals 21, as illustrated in FIG. 3(B) and FIG. 5, include an electric power source terminal, a ground terminal, four data terminals, a clock terminal, and a command terminal.

The terminal 26 is a ground terminal and the terminal 27 is an antenna terminal. In addition, an antenna 23 of a 2.4 GHz frequency band for wireless LAN is provided in the card type wireless communication module 20. Plating films 28 (see FIG. 8(B)) are formed on surfaces of the terminals 21, 26, and 27. In the embodiment of the present invention, gold plating films as the plating films 28 are formed on the surfaces of the terminals 21, 26, and 27.

The wireless LAN defined by IEEE 802.11b/g which is a wireless LAN standard uses a 2.4 GHz frequency band. In the Bluetooth (registered trademark), the 2.4 GHz frequency band which is the same frequency as the wireless LAN is used.

Figure 4:
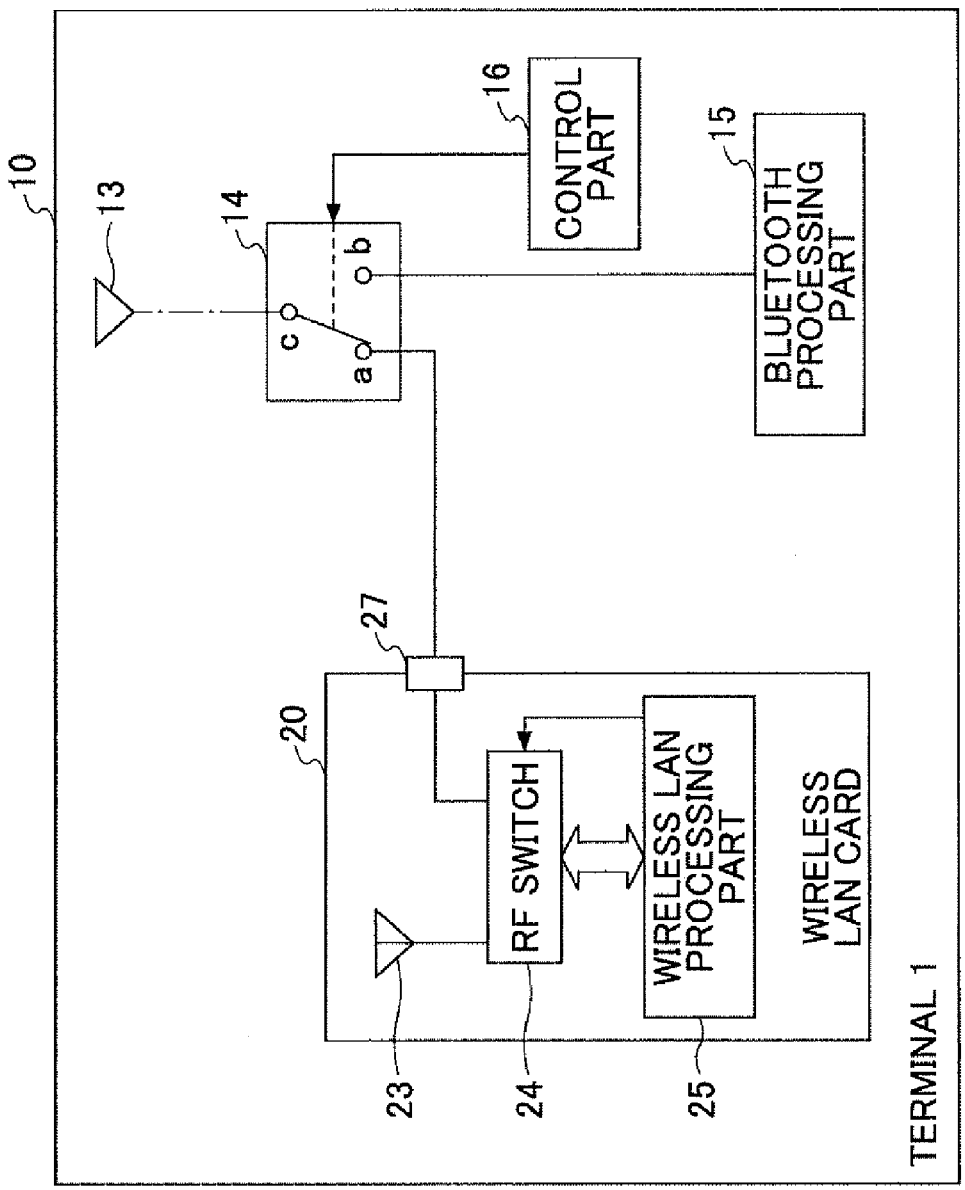
FIG. 4 is a schematic structural view of the mobile communication terminal and the card type wireless communication module of the embodiment of the present invention.

FIG. 4 is a schematic structural view of the mobile communication terminal 10 and the card type wireless communication module 20 of the embodiment of the present invention. As illustrated in FIG. 4, in the card type wireless module 20, the antenna 23 and the antenna terminal 27 are connected to an RF switch 24. The RF switch 24 is connected to a wireless LAN processing part 25. Based on the control by the wireless LAN processing part 25, the RF switch 24 connects either the antenna 23 or the antenna terminal 27 to the wireless LAN processing part 25.

The antenna terminal 27 of the card type wireless module 20 is connected to a terminal "a" of an RF switch 14 of the mobile communication terminal 10. A Bluetooth processing part 15 is connected to a terminal "b" of the RF switch 14. The antenna 13 is connected to a terminal "c" of the RF switch 14.

A control part 16 is configured to control the entirety of the mobile communication terminal 10. If the user selects a Bluetooth using mode, the control part 16 connects the terminals "b" and "c" of the RF switch 14 so that the antenna 13 is connected to the Bluetooth processing part 15. If the user selects a wireless LAN using mode, the control part 16 connects the terminals "a" and "c" of the RF switch 14 so that the antenna 13 is connected to the RF switch 24 via the antenna terminal 27 of the card type wireless communication module 20. The wireless LAN control part 25 is connected to the control part 16 of the mobile communication terminal 10 via the terminal 21.

Here, the internal structure of the card type wireless communication module 20 is discussed with reference to FIG. 5 and FIG. 6. In the card type wireless communication module 20, only the terminals 21, 26, and 27 are exposed to an outside of the card type wireless communication module 20 and other elements such as the antenna 23 are sealed within a package 20a made of resin. However, for the convenience of explanation, illustration of the package 20a is omitted in FIG. 5 and FIG. 6.

Figure 6:
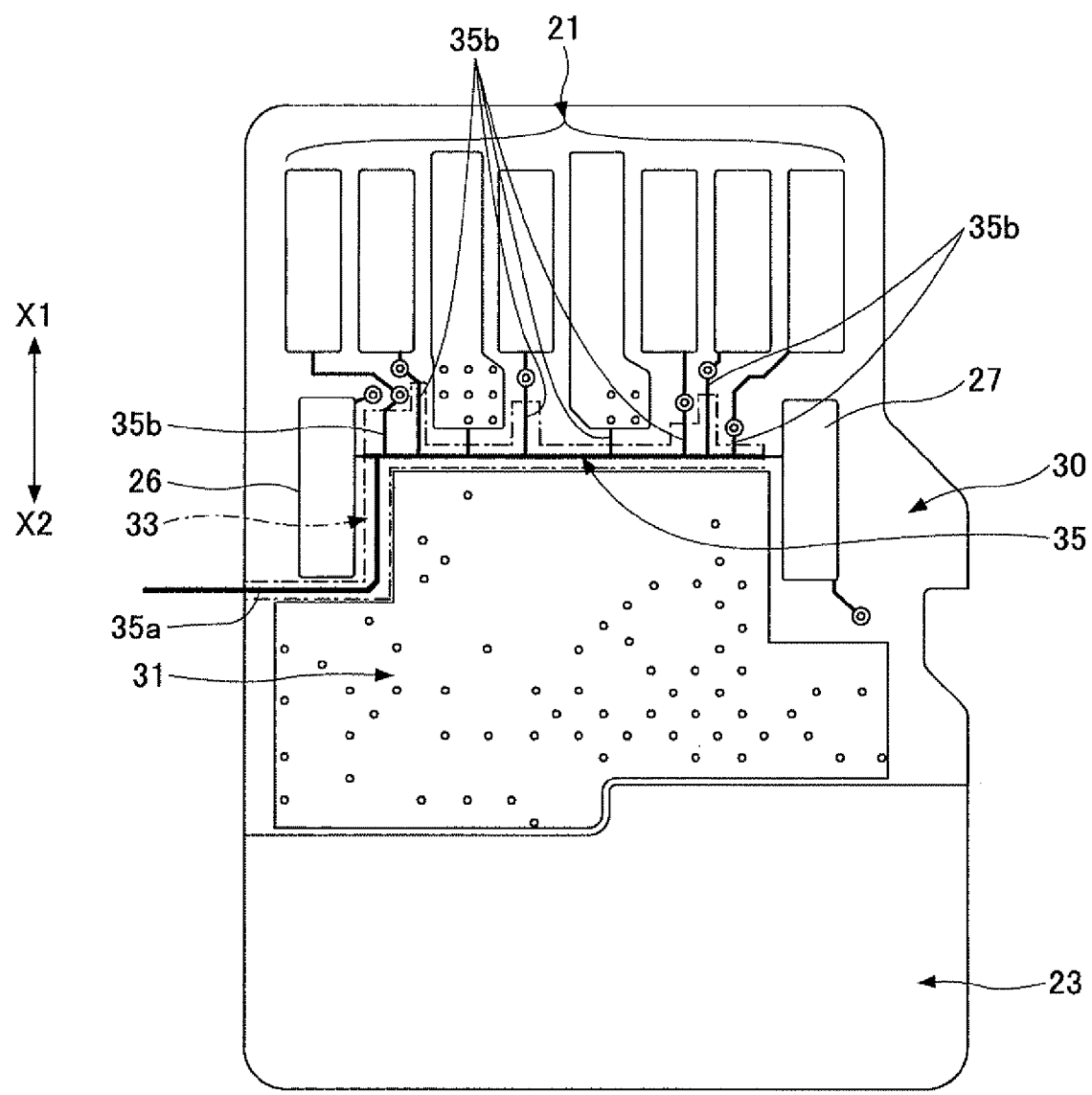
FIG. 6 is a schematic view showing an internal structure of the card type wireless communication module in a state where a feeding wiring pattern is formed.

As illustrated in FIG. 5 and FIG. 6, the card type wireless communication module 20, plural terminals 21, 26, and 27, the antenna 23, and a ground pattern 31 are provided on a board 30. The board 30 has a configuration corresponding to the micro SD card.

As discussed above, the terminals 21 are terminals for an electric power source, ground and signals. The terminals 21 are formed at an end part (upper end part in FIG. 5 and FIG. 6) at an inserting direction side (X1 direction in FIG. 5 and FIG. 6) of the board 30. The ground terminal 26 and the antenna terminal 27 are provided in positions shifted from forming positions of the terminals 21 in a direction indicated by an arrow X2 in FIG. 5 and FIG. 6, namely positions near the ground pattern 31 discussed below.

The terminals 21, 26, and 27 are led to the rear surface of the board 30 via respective via-holes 21a, 26a, and 27a piercing the board 30. An electronic circuit, such as the RF switch 24, the wireless LAN processing part 25, or the like, is formed on the rear surface of the board 30. Thus, the terminals 21, 26, and 27 are electrically connected to the electronic circuit formed on the rear surface of the board 30 via the respective via-holes 21a, 26a, and 27a.

In this embodiment, a meandering antenna where an antenna pattern is formed in a meandering shape is used as the antenna 23. Since the meandering antenna 23 can be miniaturized, the antenna 23 can be used for the card type wireless communication module 20 having a small micro SD card configuration. However, the configuration of antenna pattern of the antenna 23 is not limited to the meandering-shaped configuration. Other antennas which can be miniaturized, such as a chip antenna using a high-dielectric material, can be used as the antenna 23.

The ground pattern 31 functions as a shield for improving high frequency properties of a high frequency circuit such as the wireless LAN processing part 25 or the like and functions to improve the mechanical strength of the board 30. The ground pattern 31 is connected to ground wiring formed on the rear surface of the board 30 via via-holes 31a formed in the board 30.

A feeding wiring pattern arrangement area 33 is an area where power is fed to the terminals 21, 26, and 27 when an electrolytic plating process for forming the plating films 28 is applied and the feeding wiring pattern 35, to be removed after the electrolytic plating process is completed, is formed. FIG. 6 shows where the feeding wiring pattern 35 is formed in the feeding wiring pattern arrangement area 33. The feeding wiring pattern arrangement area 33 has a size, as illustrated in FIG. 6, whereby only a single feeding wiring pattern 35 can be formed. More specifically, a width (indicated by an arrow $\Delta W$ in FIG. 5) of the feeding wiring pattern arrangement area 33 is approximately 1 mm as maximum and approximately 0.4 mm as minimum.

The feeding wiring pattern arrangement area 33 is formed between forming positions of the terminals 21, 26, and 27 on the board 30 and a forming position of the ground pattern 31. Thus, the antenna 23 is formed in a position at an opposite side (a position in the X2 direction) of the forming position of the ground pattern compared to the forming position of the feeding wiring pattern arrangement area 33 so that the forming position of the ground pattern 31 is sandwiched between the antenna 23 and the feeding wiring pattern arrangement area 33.

Next, a manufacturing method of the card type wireless communication module 20 is discussed.

FIG. 6 shows where the terminals 21, the antenna 23, the ground terminal 26, the antenna terminal 27, the ground pattern 31, the feeding wiring pattern 35, and the via-holes 21a, 26a, 27a, and 31a, and others are formed on the board 30. As forming methods of the terminals 21, 26 and 27, the antenna 23 and the ground pattern 31 formed on the board 30 and the via-holes 21a, 26a, 27a, and 31a, a known method is used. Because of this, in the following explanation, manufacturing steps after the terminals 21, 26, and 27, the antenna 23, the patterns 31 and 35, the via-holes 21a, 26a, 27a, and 21a, and others are formed are discussed. Explanation of the manufacturing steps before the terminals 21, 26, and 27, the antenna 23, the patterns 31 and 35, and via-holes 21a, 26a, 27a, and 21a, and others are formed is omitted.

As shown in FIG. 6, the feeding wiring pattern 35 is formed in the feeding wiring pattern arrangement area 33. The feeding wiring pattern arrangement area 33 is formed close to the terminals 21, 26, and 27 and the ground terminal 31. The feeding wiring pattern 35 includes a main line pattern 35a and plural bifurcation patterns 35b branching from the main line pattern 35a. The main line pattern 35a and the bifurcation patterns 35b are formed in a body.

The main line pattern 35a is connected to an electric power source 44 at the time of an electrolytic plating process discussed below. See FIG. 7. The bifurcation patterns 35b branch from the main line pattern 35a. The bifurcation patterns 35b are connected to the corresponding via-holes 21a, 26a, and 27a. Thus, the terminals 21, 26, and 27 are electrically connected to the main line pattern 35a via the via-holes 21a, 26a, and 27a and the bifurcation patterns 35b. In other words, the terminals 21, 26 and 27 are electrically connected to the feeding wiring pattern 35.

An electrolytic plating process, whereby plating films 28 are formed on the terminals 21, 26, and 27, is applied to the board 30 having a structure illustrated in FIG. 6. The plating process applied to the terminals 21, 26, and 27 is performed by providing resist as a mask (protection film) to parts where the plating process is not to be applied, such as the antenna 23, the ground pattern 31, the feeding wiring pattern 35, and others.

Figure 7:
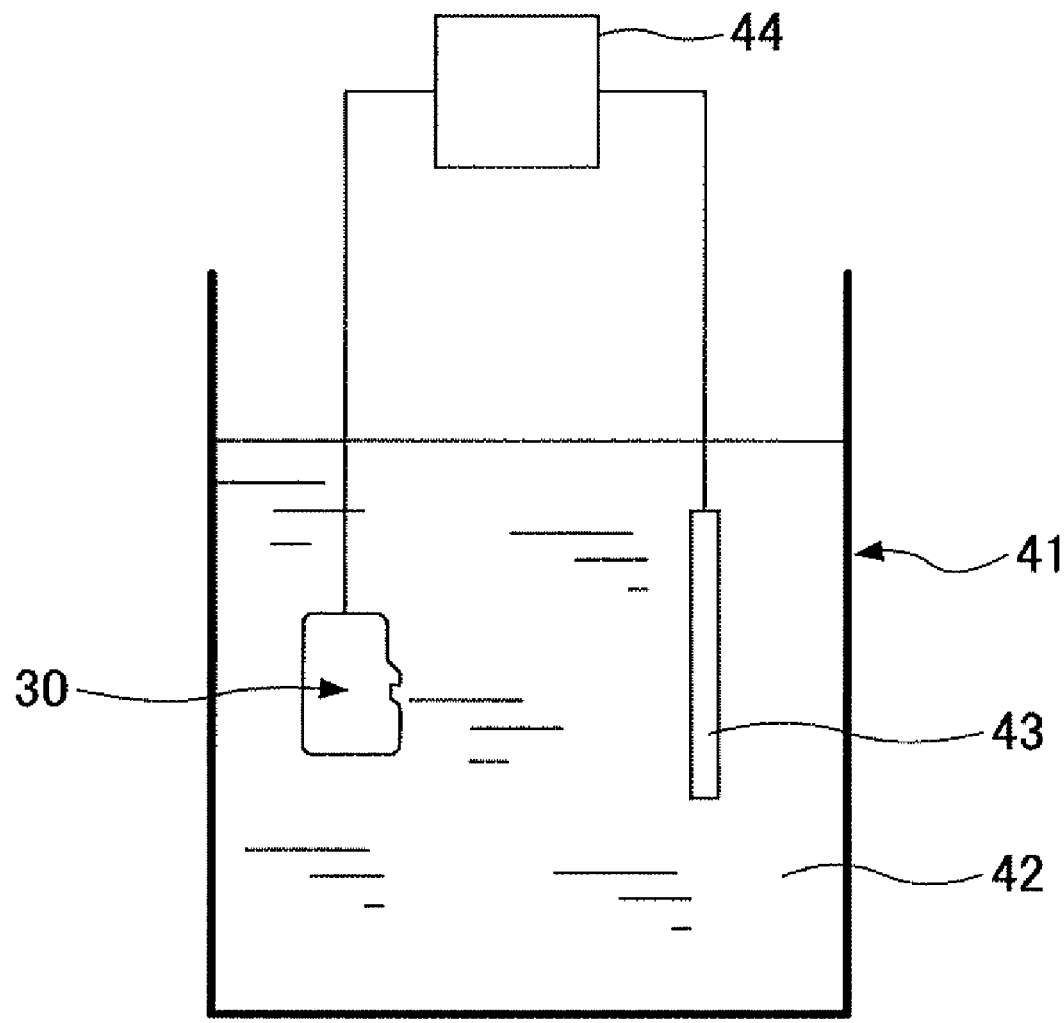
FIG. 7 is a schematic structural view of an electrolytic plating apparatus configured to apply a plating process to a terminal.
Figure 8:
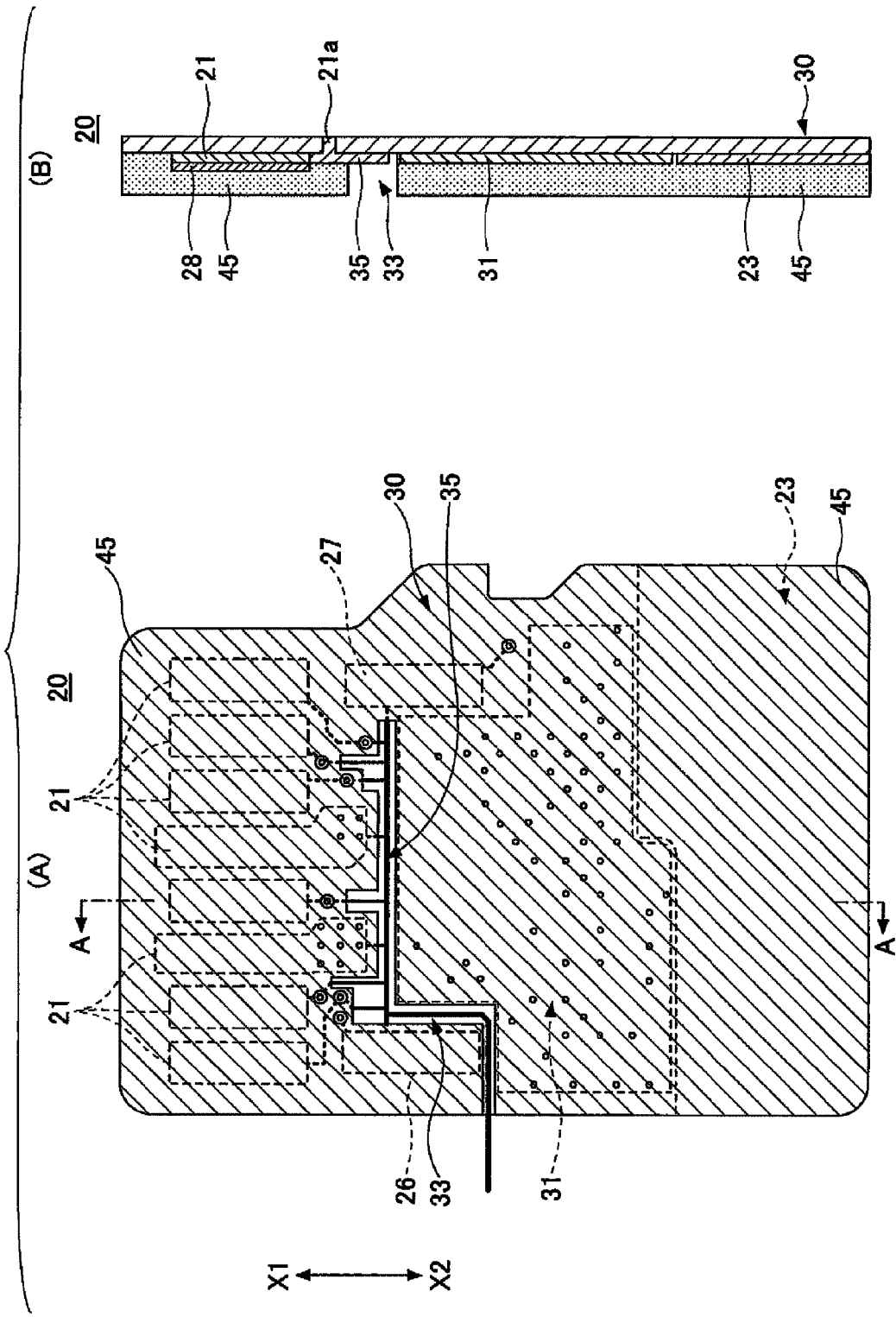
FIG. 8 is a first view showing a structure where the feeding wiring pattern is removed ((A) is an expanded view of the internal structure and (B) is a cross-sectional view taken along a line A-A)
Figure 9:
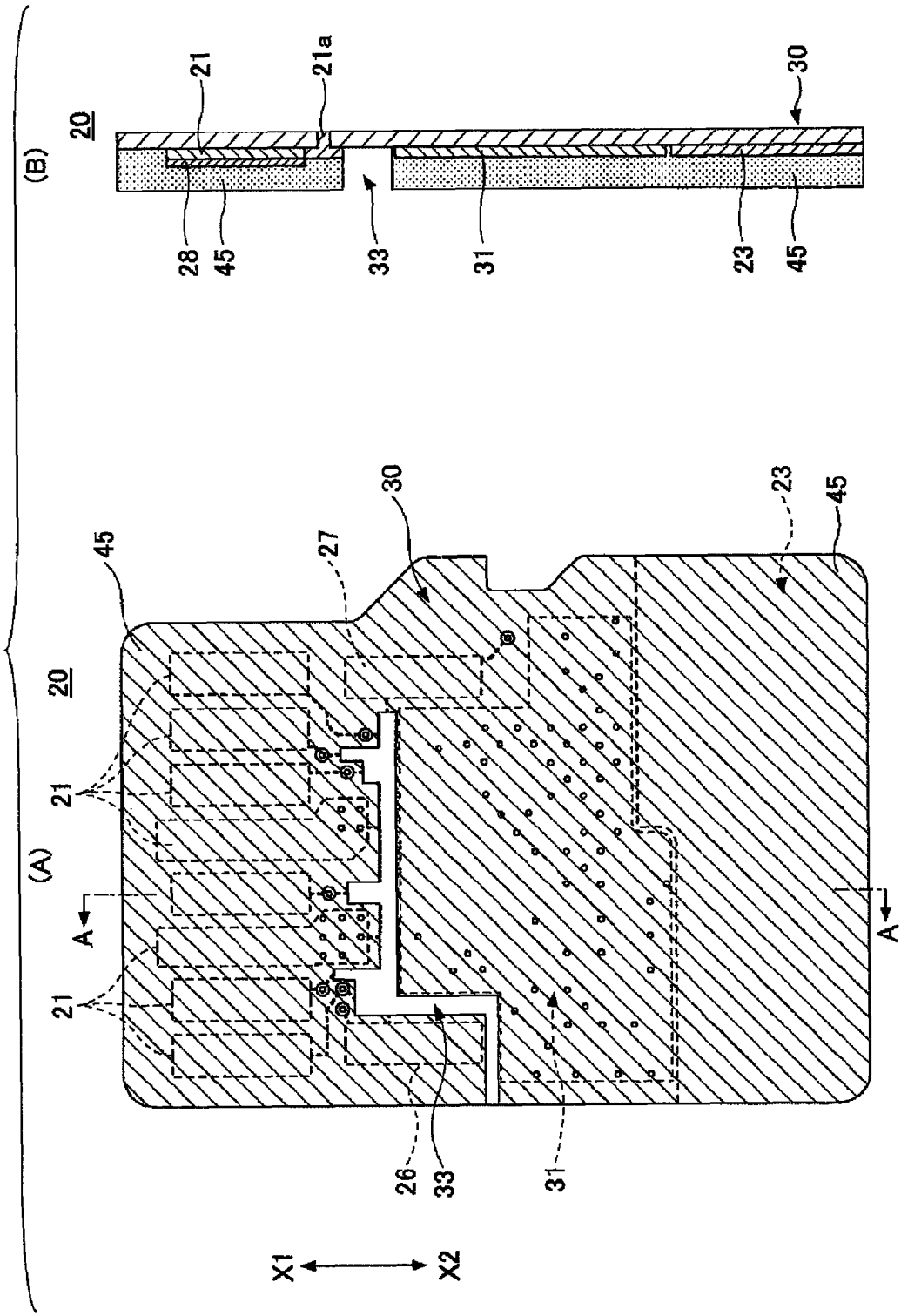
FIG. 9 is a second view showing a structure where the feeding wiring pattern is removed ((A) is an expanded view of the internal structure and (B) is a cross-sectional view taken along a line A-A)
Figure 10:
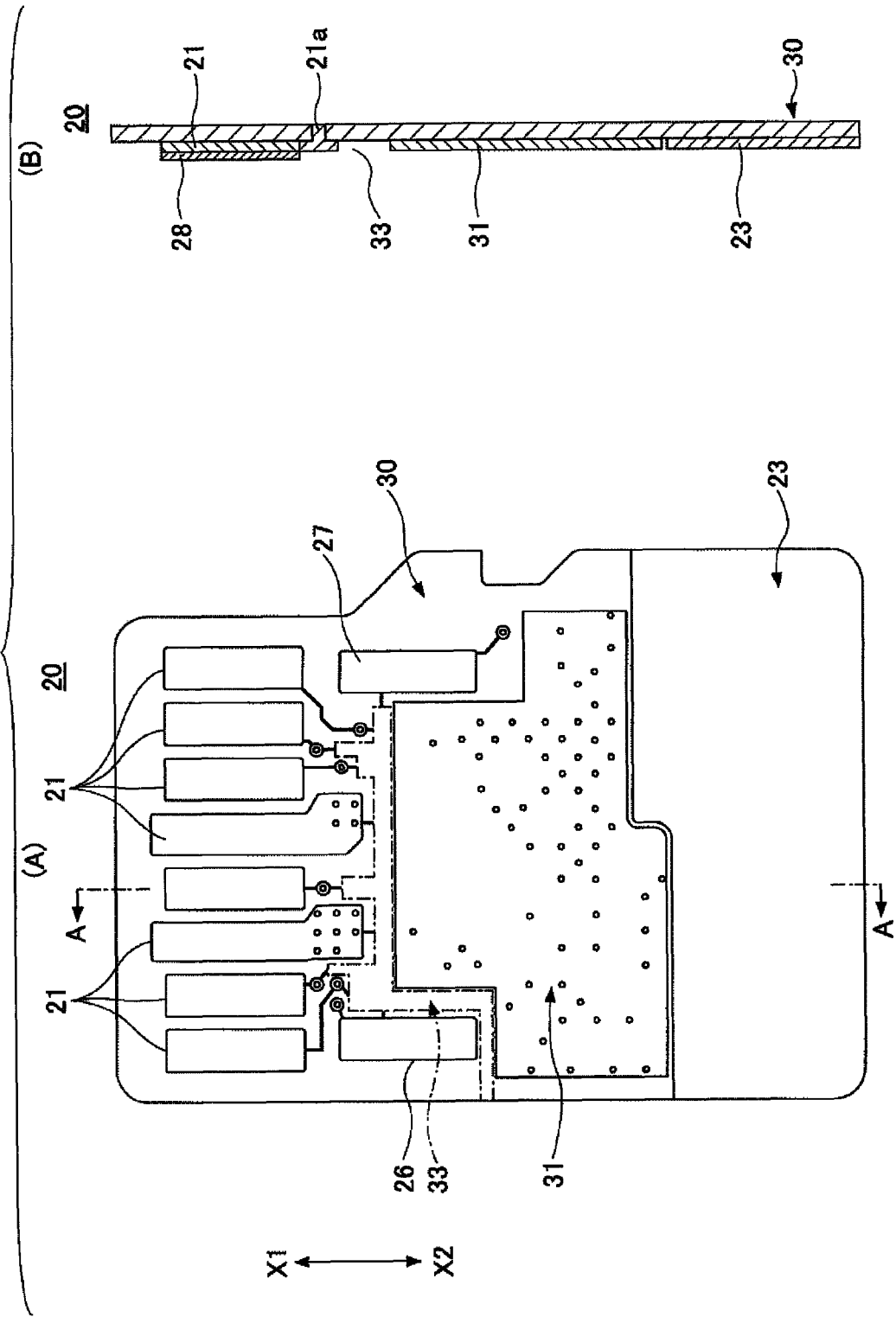
FIG. 10 is a third view showing a structure where the feeding wiring pattern is removed ((A) is an expanded view of the internal structure and (B) is a cross-sectional view taken along a line A-A)

FIG. 7 is a schematic structural view of an electrolytic plating apparatus 40 configured to apply the electrolytic plating process to the terminals 21, 26, and 27. The electrolytic plating apparatus 40 includes a plating tank 41, plating liquid 42, the electric power source 44, and others.

The board 30 and an electrode 43 (made of gold in this embodiment) are soaked in the plating liquid 42 supplied in the plating tank 41 in a state where the board 30 and the electrode 43 are connected to the electric power source 44. In this state, if an electric current flows between the feeding wiring pattern 35 and the electrode 43, since the feeding wiring pattern 35 is connected to the terminals 21, 26, and 27, the plating films 28 (gold plating films) are formed on the surfaces of the terminals 21, 26, and 27. After the electrolytic plating process is completed, the board 30 is taken out from the plating liquid 42, so that the resist provided for preventing erosion by a designated cleaning process and the plating liquid is removed.

Next, a removing process of the feeding wiring pattern 35 is applied. In order to remove the feeding wiring pattern 35, first, the resist 45 as a mask (protection film) is formed on the board 30 except the feeding wiring pattern arrangement area 33 where the feeding wiring pattern 35 is formed.

FIG. 8(A) and FIG. 8(B) show a state where the resist 45 is formed on the board 30 except the feeding wiring pattern arrangement area 33. The board 30 in this state is provided in the etching apparatus and an etching process (etch-back) of the feeding wiring pattern 35 is performed. In the etching process, wet etching or dry etching may be used.

In this embodiment, the etching process is performed until the feeding wiring pattern 35 is completely removed. FIG. 9(A) and FIG. 9(B) show where the feeding wiring pattern 35 is removed by the etching process. As illustrated in FIG. 9(B), by removing the feeding wiring pattern 35 completely, the surface of the board 30 is exposed and the terminals 21, 26, and 27 are electrically isolated from each other.

Next, the resist 45 configured to protect the terminals 21, 26, and 27, the antenna 23, the ground pattern 31, and others is removed. FIG. 10(A) and FIG. 10(B) show where the resist 45 is removed. After removal of the resist 45 is completed, resin sealing of the board 30 is performed so that the package 20a is formed. At this time, a sealing process is performed so that the terminals 21, 26, and 27 are exposed to the outside of the package 20a. By performing the above-mentioned processes, the card type wireless communication module 20 is manufactured.

Figure 1:
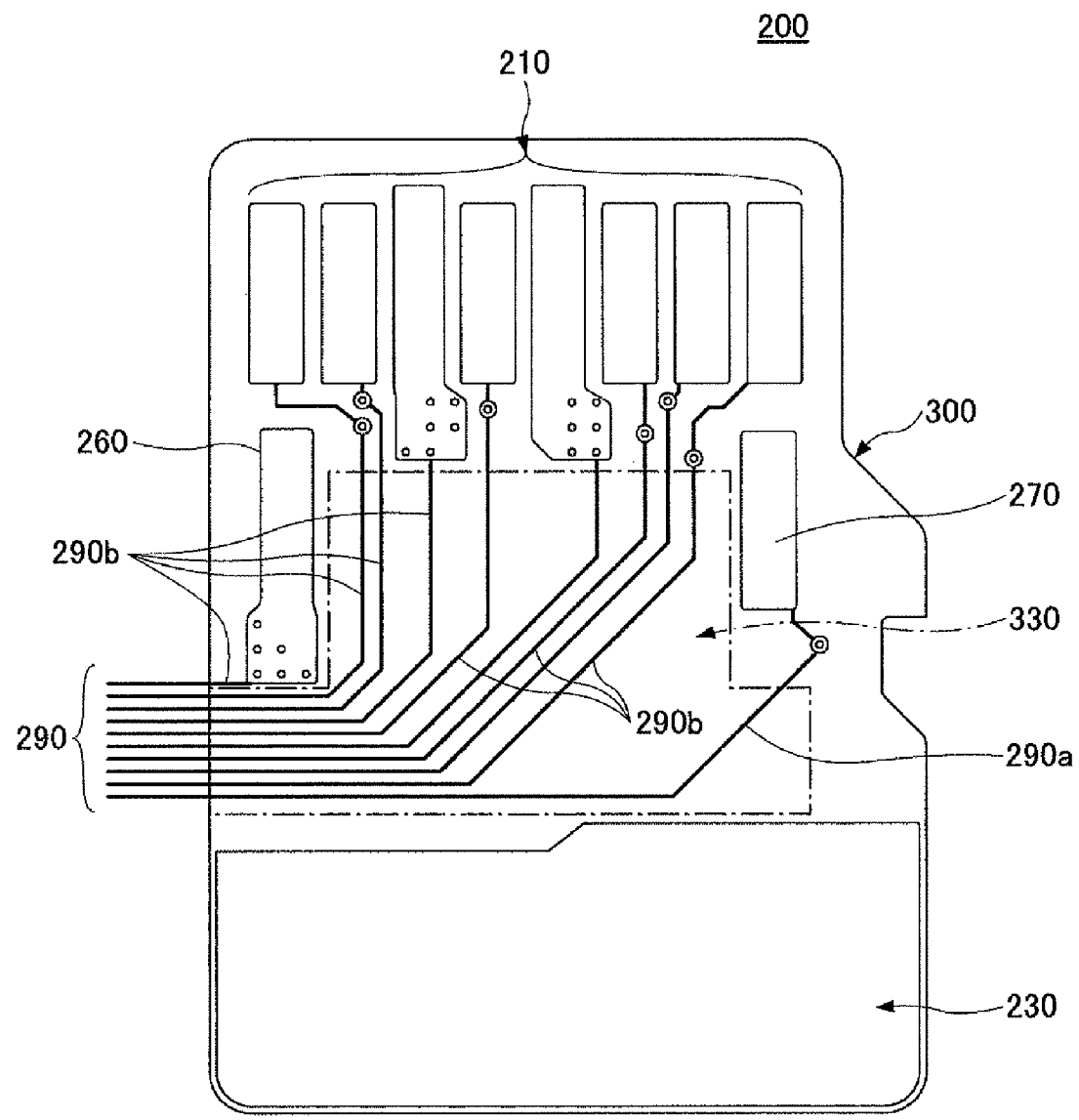
FIG. 1 is a schematic view showing an internal structure of a related art card type wireless communication module.
Figure 2:
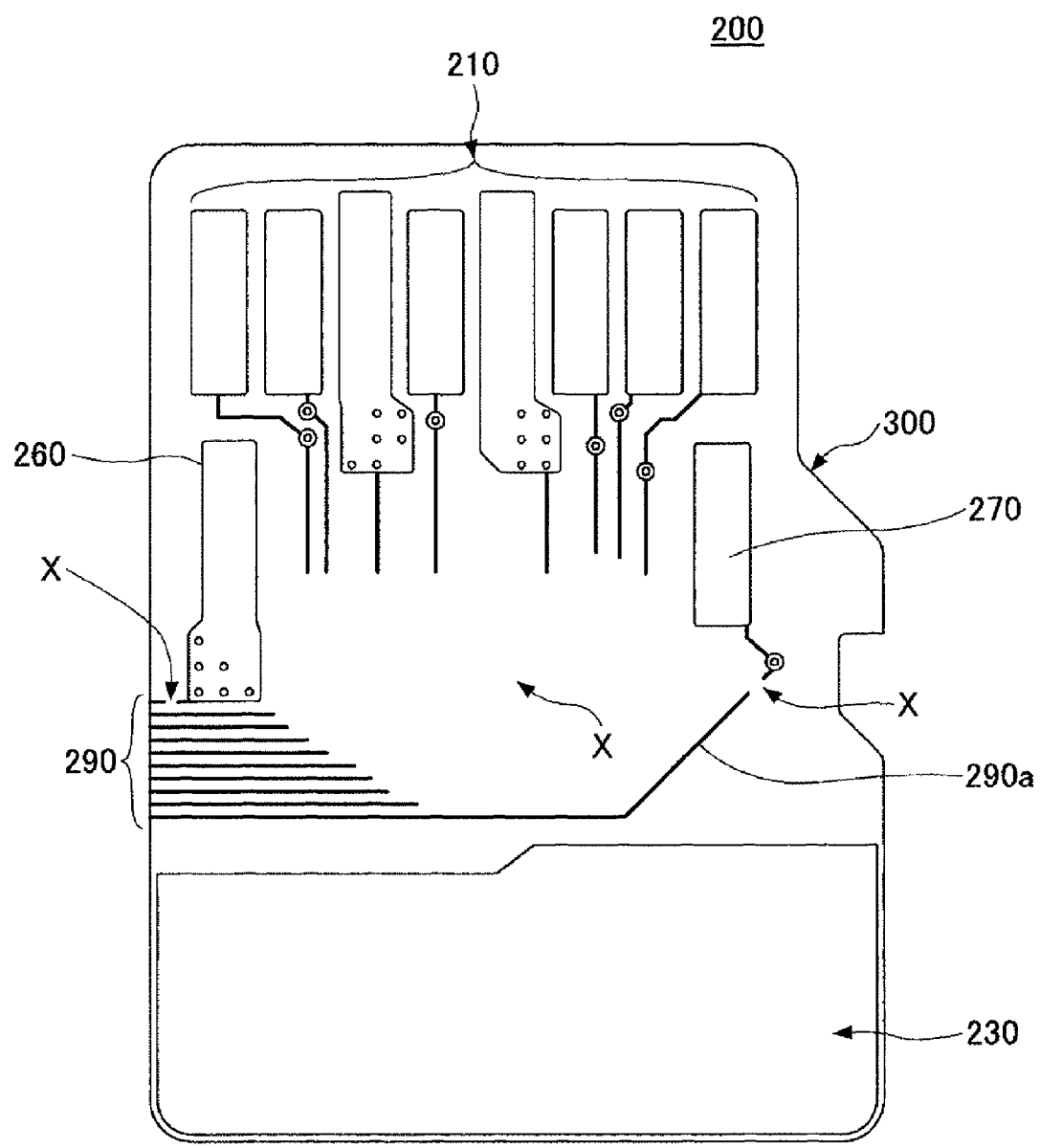
FIG. 2 is a schematic view of the related art card type wireless communication module in a state where a feeding wiring pattern is cut.

As discussed above, in the card type wireless communication module 20 of the embodiment of the present invention, the feeding wiring pattern 35 is removed by etching. Therefore, the feeding wiring pattern 35 is removed in the vicinities of the terminals 21, 26 and 27. Accordingly, at the antenna terminal 27 where the high frequency signal is transferred, the remaining wiring pattern 290a (see FIG. 2) which remains in the related art does not exist in this embodiment. Therefore, it is possible to prevent such as the related art remaining wiring pattern 290a from operating as a distributed constant circuit or antenna. Hence, it is possible to transfer the high frequency signal efficiently.

In addition, in the card type wireless communication module 20 of the embodiment of the present invention, at the time of electrolytic plating of plural terminals 21, 26, and 27, power feeding can be performed by a single feeding wiring pattern 35. Therefore, it is not necessary to form the same number of the feeding wiring patterns 35 as the number of terminals 21, 26, and 27 on the board 30. Because of this, it is possible to make the feeding wiring pattern arrangement area 33 necessary for forming the feeding wiring pattern 35 small. Hence, it is possible to improve the freedom degree of the arrangement of components on the board 30.

In this embodiment, since the area of the feeding wiring pattern arrangement area 33 is small, a solid layer of the ground pattern 31 may be formed between the feeding wiring pattern arrangement area 33 and the antenna 23. The ground pattern 31 functions as a shield for improving high frequency properties of a high frequency circuit provided at the board 30 and functions to improve the mechanical strength of the board 30. Therefore, since the ground pattern 31 can be formed, it is possible to improve the reliability of the card type wireless communication module 20.

Figure 11:
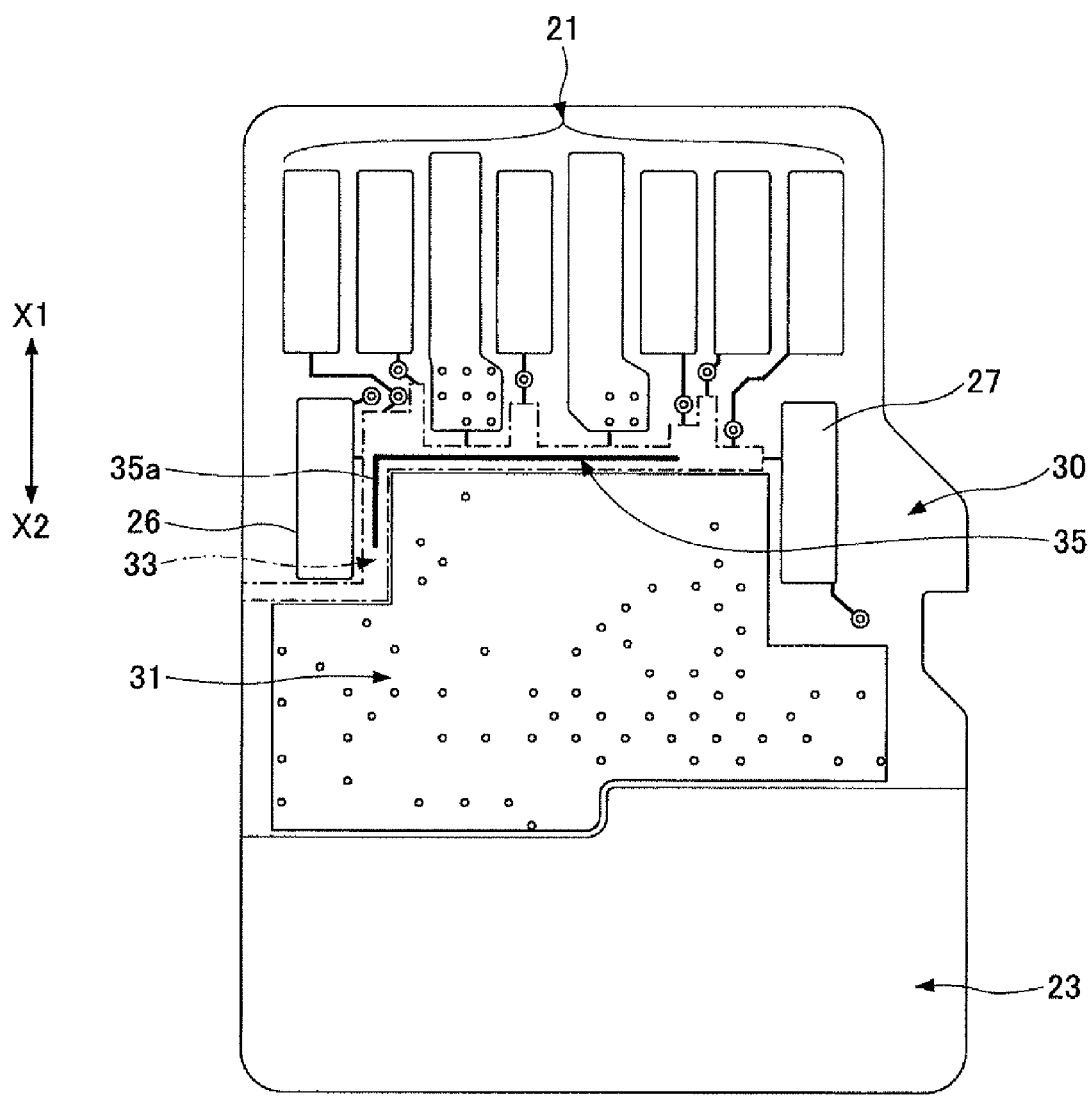
FIG. 11 is a schematic view showing an internal structure of a card type wireless communication module of a modified example of the embodiment of the present invention.

FIG. 11 shows a modified example of the above-discussed card type wireless communication module 20. In the above-discussed card type wireless communication module 20, the feeding wiring pattern 35 formed in the feeding wiring pattern arrangement area 33 is removed by etching at the time of electrolytic plating. On the other hand, in the modified example, a part of the feed wiring pattern 35 remains in the feeding wiring pattern arrangement area 33.

By removing all of the bifurcation patterns 35b, electrical connections between the feeding wiring pattern 35 and the terminals 21, 26 and 27 are cut. In addition, the length of the wiring pattern 35a is set so that impedance matching with the circuit of the board 30 can be made based on the impedance of the circuit of the board 30. Thus, by using the feeding wiring pattern 35 for impedance matching, it is possible to miniaturize the card type wireless communication module 20 in this example compared to a structure where an impedance matching pattern is formed separately.

Thus, according to the above-discussed embodiment of the present invention, the following card type wireless communication module can be provided. In the following explanation, the numerical references are just for reference and therefore a scope of claims mentioned below is not limited by these numerical references.

One aspect of the embodiments of the present invention may be to provide a card type wireless communication module, including: a board (30); a plurality of terminals (21, 26, 27) formed on the board (30), the terminals (21, 26, 27) including an external antenna terminal (27), the terminals (21, 26, 27) having a plating process applied thereto; and a ground pattern (31) formed on the board (30); wherein a feeding wiring pattern (35) arrangement area is formed between the forming positions of the terminals (21, 26, 27) on the board (30) and a forming position of the ground pattern (31), the feeding wiring pattern arrangement area (33) has a feeding wiring pattern (35) formed thereon, the feeding wiring pattern (35) feeds power to the terminals (21, 26, 27) at the time of an electrolytic plating process, and the feeding wiring pattern (35) is removed after the electrolytic plating process is completed.

The board (30) may include an internal antenna (23); and the internal antenna (23) may be formed in a position at an opposite side of the forming position of the ground pattern (31) compared to a position of the feeding wiring pattern arrangement area (33) so that the forming position of the ground pattern (31) may be sandwiched between the internal antenna (23) and the feeding wiring pattern arrangement area (33).

A part (35a) of the feeding wiring pattern (35) may remain in the feeding wiring pattern arrangement area (33); and impedance matching of a circuit of the board (30) may be achieved by using the remaining part (35a) of the feeding wiring pattern (35).

At least one of the terminals (21, 26, 27) may be led to a rear surface relative to a surface of the board (30) where the terminals (21, 26, 27) are formed, by a via-hole (21a, 26a, 27a) formed in the board.

The board (30) may have a configuration corresponding to an external configuration of a micro SD card.

According to the above-discussed embodiments of the present invention, it is possible to provide a card type wireless communication module whereby degradation of transmission efficiency of a high frequency characteristic can be prevented and strength of the module can be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A wireless communication module, comprising:
   a board;
   a plurality of terminals formed on the board, the terminals including an external antenna terminal, the terminals having a plating process applied thereto; and
   a ground pattern formed on the board;
   wherein a feeding wiring pattern arrangement area is formed between forming positions of the terminals on the board and a forming position of the ground pattern, the feeding wiring pattern arrangement area having a size whereby only one feeding wiring pattern can be formed thereon, and wherein the feeding wiring pattern feeds power to the terminals at the time of an electrolytic plating process, and the feeding wiring pattern is removed after the electrolytic plating process is completed.

2. The wireless communication module as claimed in claim 1,
   wherein the board includes an internal antenna; and
   the internal antenna is formed in a position at an opposite side of the forming position of the ground pattern compared to a position of the feeding wiring pattern arrangement area so that the forming position of the ground pattern is sandwiched between the internal antenna and the feeding wiring pattern arrangement area.

3. The wireless communication module as claimed in claim 1,
   wherein a part of the feeding wiring pattern remains in the feeding wiring pattern arrangement area; and
   impedance matching of a circuit of the board is achieved by using the remaining part of the feeding wiring pattern.

4. The wireless communication module as claimed in claim 1,
   wherein at least one of the terminals is led to a rear surface relative to a surface of the board where the terminals are formed, by a via-hole formed in the board.

5. The wireless communication module as claimed in claim 1,
   wherein the board has a configuration corresponding to an external configuration of a micro SD card.

6. The wireless communication module as claimed in claim 1, wherein the feeding wiring pattern arrangement area has said size that is enough to provide a space of the board to form the ground pattern.

* * * * *